United States Patent
Zylla

[11] Patent Number: 5,344,509
[45] Date of Patent: Sep. 6, 1994

[54] PROCESS FOR PREVENT THE FORMATION OF ADHESIVES WHEN ANNEALING STEEL BAND

[75] Inventor: Peter Zylla, Krefeld, Fed. Rep. of Germany

[73] Assignee: Messer Griesheim GmbH, Fed. Rep. of Germany

[21] Appl. No.: 20,560

[22] Filed: Feb. 23, 1993

[30] Foreign Application Priority Data

Mar. 9, 1992 [DE] Fed. Rep. of Germany ....... 4207394

[51] Int. Cl.$^5$ ............................................. C21D 11/00
[52] U.S. Cl. ................................... 148/601; 148/633; 148/287; 427/156; 427/255.3
[58] Field of Search ................ 148/601, 633, 638, 207, 148/208, 240, 287; 427/156, 255.3

[56] References Cited

U.S. PATENT DOCUMENTS 3,873,377  3/1975  Fisher et al. .......................... 148/601

FOREIGN PATENT DOCUMENTS 0045207  3/1982  European Pat. Off. .
132443   9/1978  Fed. Rep. of Germany ...... 148/601

OTHER PUBLICATIONS

Metals Handbook 9th Ed. vol. 4, Heat Treating, 1979, pp. 389–393.
Arnold, J., Open Coil Process: Shows Way to Gas Alloy, Iron and Steel Engineer, Aug. 1960, pp. 91–111.

Primary Examiner—Richard O. Dean
Assistant Examiner—Sikyin Ip
Attorney, Agent, or Firm—Connolly & Hutz

[57] ABSTRACT

A process to prevent the formation of adhesives when annealing a steel band having a low carbon content uses an inert gas consisting of nitrogen and hydrogen and includes the phases of heating up, holding time and cooling. The process is characterized in that during the holding time, the steel band is coated by oxidation with a thin coating which is then completely removed by reduction during the cooling phase.

2 Claims, 2 Drawing Sheets

PROCESS FOR PREVENT THE FORMATION OF ADHESIVES WHEN ANNEALING STEEL BAND

BACKGROUND OF INVENTION

The invention relates to a process to prevent the formation of adhesives when annealing steel band having a low carbon content. Such process uses an inert gas consisting of nitrogen and hydrogen and has the phases of heating up, holding time and cooling.

Steel band is annealed in the form of tight coils in pot furnaces, hood-type furnaces or continuous roller furnaces. An $N_2$-$H_2$ gas mixture or else an exothermic gas is normally employed as the inert gas. Adhesives are often formed when these steel bands are annealed.

These band adhesives are influenced by many factors. The main ones are: the geometry and dimensions of the surface roughness, the type of inert gas, the contact pressure, the temperature and the time.

The literature speculates that adhesives are formed at the site of the steel surface where elevated pressure and a relative movement of the spirals occur during the cooling stage. As a result, adhesion and diffusion phenomena take place.

SUMMARY OF INVENTION

The invention is based on the task of creating a process to prevent the formation of adhesives when annealing steel band having a low carbon content.

In accordance with the invention, during the holding time, the steel band is coated by means of oxidation with a thin coating which is then completely removed by reduction during the cooling phase.

The steel bands are annealed (held) at temperatures ranging from 650° C. to 720° C. [1202° F. to 1328° F.].

The coating formed by means of the process according to the invention serves to prevent the individual spirals from adhering to each other at the beginning of the cooling phase, that is to say, up to a temperature of 600° C. [1112° F.] in the core. Since this is when the tensions inside the coil between the individual spirals are at their highest level, this limit temperature was designated as "critical".

When the temperature falls below this critical value, it is necessary to once again create reducing conditions in the furnace in order to completely reduce the oxide coating thus formed as the annealing operation proceeds.

This can be done by changing the water-gas equilibrium (hood under pressure) or by replacing the furnace atmosphere with, for example, $N_2/H_2$.

THE DRAWINGS

FIG. 1 is a graph showing the C-H-O three-substance system used to determine the atomic composition of the inert gas at 680° C. [1256° F.]; and FIGS. 2a, b are graphs showing an example of the course of the annealing phases when the band steel is being annealed (680° C. [1256° F.]), dividing up the $N_2$-$H_2$-$CO_2$ inert gas into two theoretical gas mixtures.

DETAILED DESCRIPTION

Figure 1:
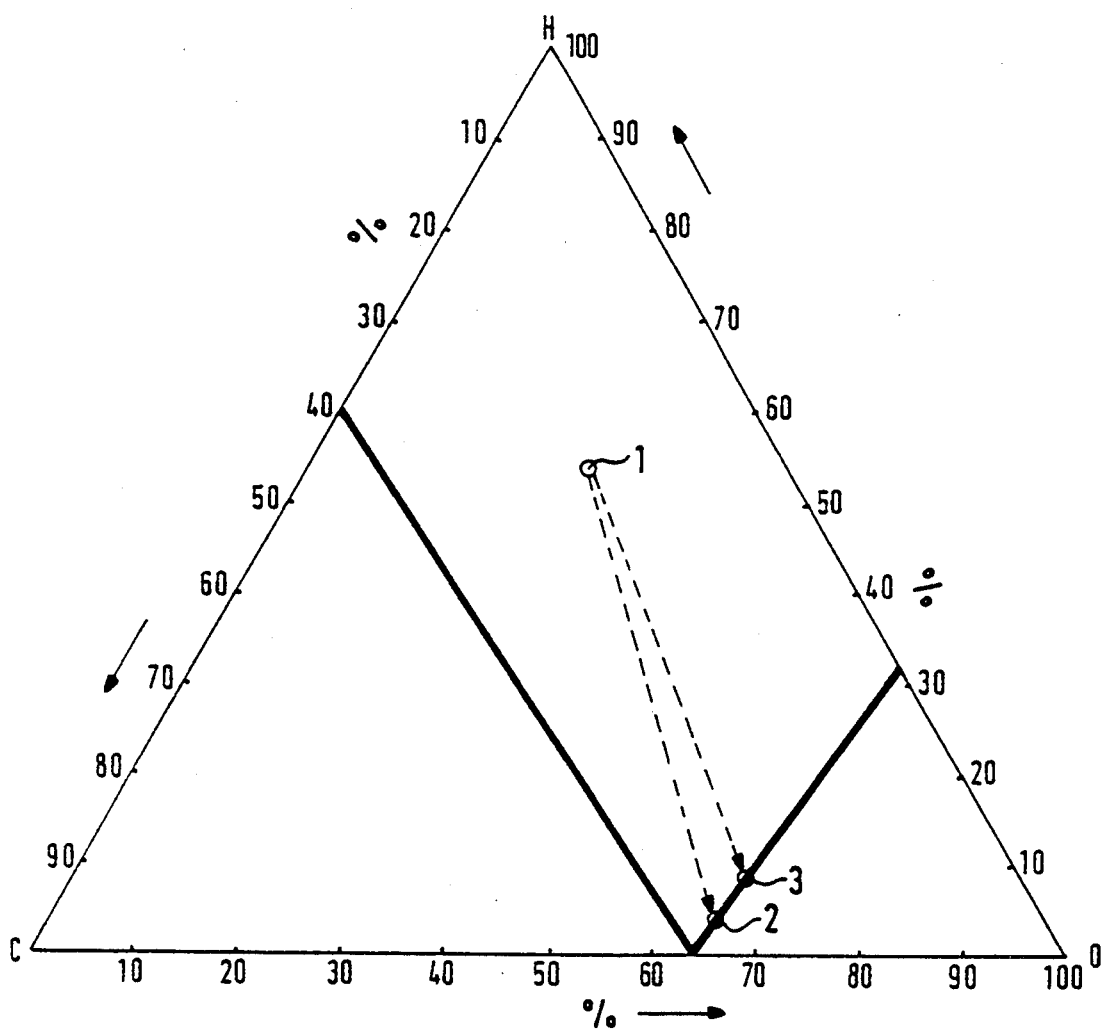

In FIG. 1, Point 1 describes an $N_2$-$H_2$ gas mixture, Point 2 an exothermic gas and Point 3 an $N_2$-$H_2$ gas mixture with the addition of $CO_2$.

Figure 2A:
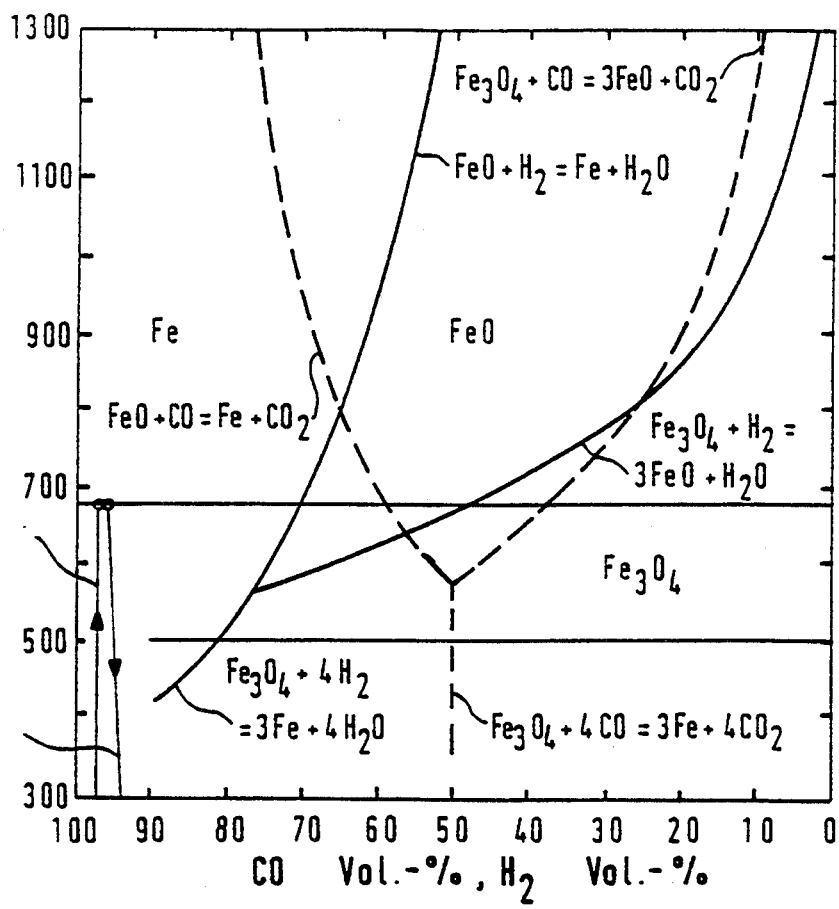
Figure 2B:
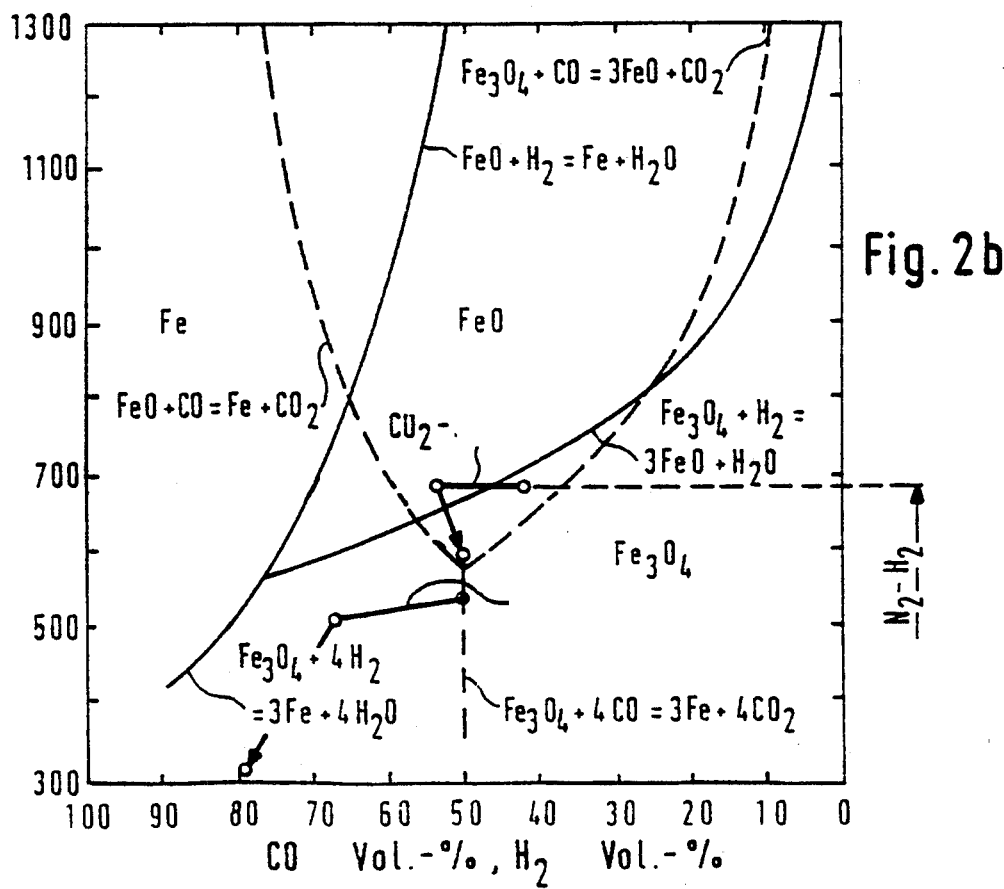

FIG. 2a refers to the theoretical $H_2$-$H_2O$ gas mixture, which is responsible for the reduction. FIG. 2b refers to the theoretical CO-$CO_2$ gas mixture, which is responsible for the oxidation (holding time until approximately 600° C. [1112° F.])/reduction (T<600° C. [1112° F.]).

In the case of gas mixtures consisting of carbon monoxide (CO), carbon dioxide ($CO_2$), hydrogen ($H_2$) or else methane ($CH_4$), there is a reaction among the components until a uniform carbon activity is reached.

If there is no equilibrium between the metal surface and the gas phase, carbonization or decarbonization reactions or else oxidation or reduction reactions bring about a mass transfer between the two phases until a state of equilibrium is reached.

Thus, every instance of carbon activity resulting from the desired chemical composition of the steel surface—in a state of equilibrium at a defined temperature—is associated with a certain gas composition.

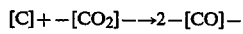

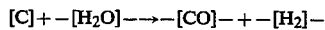

Since the carbon activity for low-alloy steel has to be low and in this case, the oxidation/reduction reactions are important, the gas composition was associated with the homogenous water-gas reaction, which is a compilation of the following reactions:

$$CO_2 = CO + \tfrac{1}{2}O_2$$
$$\tfrac{1}{2}O_2 + H_2 = H_2O$$

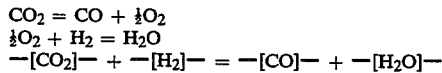

At a defined temperature, the corresponding state of equilibrium is employed to reach a certain gas composition.

For example, an $N_2$-$H_2$ (97%:30%) gas mixture was selected. With the addition of a certain quantity of $CO_2$ and the total quantity of inert gas, the course of the water-gas reaction at certain temperatures is controlled. In the homogeneous state, the following reactions take place under the hood:

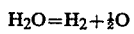

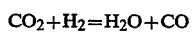

The transfer of oxygen then causes the following:

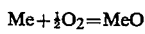

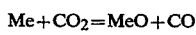

Since the reaction $CO_2 \rightarrow CO + \tfrac{1}{2}O_2$ is relatively slower in comparison to $H_2O = H_2 + \tfrac{1}{2}O$, longer times for the oxidation in the CO-$CO_2$ gas mixture have to be expected.

EXAMPLE

The following generally applies to the homogenous water-gas reaction:

$$Lg\ K_w = Lg\ (P_{CO}\cdot P_{H_2O}/P_{CO_2}\cdot P_{H_0}) = 1717/T + 1.575$$

At, for instance, 680° C. [1256° F.], $K_w = 0.6$.

If, for example, a gas mixture consisting of 1.2% $CO_2$ and 3.0% $H_2$ and 0.004% $H_2O$ is heated up to 680° C. [1256° F.], the question arises as to the gas composition with which the equilibrium was established. The reaction equation in a homogenous system follows the relationship:

$$V_A A + V_R B + \ldots + \Delta H = V_B E + V_F F + \ldots$$

wherein Vi, i = −[A, ... F]− stands for stoichiometric molar numbers of the substances i.

When using the molar fraction $X_i = P_i/P$, the law of mass action acquires the following form:

$$E^{VE} \cdot F^{VF} / A^{VA} \cdot B^{VB} = K_p \cdot p^{\exp - \Delta \Sigma V_i}$$

$$E^{VE} \cdot F^{VF} / A^{VA} \cdot B^{VB} = K_{p'} p^{\exp - \Delta \Sigma V_i}$$

The reaction index $\Delta \Sigma V_i$, i.e. the sum of the molar numbers of the initial products minus the sum of the molar numbers of the final products, is as follows:

$$\Delta \Sigma V_i = V_B + V_P - V_A - V_B$$

and it provides information on the volume change and pressure dependence.

In the above-mentioned example of the water-gas reaction, the result is that $\Delta \Sigma V_i = 0$, whereby the following generally applies:

$$K_P \cdot P_{\exp} - \Delta \Sigma V_i = K_C (RT/P) \exp \Delta \Sigma V_i$$

Since $\Delta \Sigma V_i = 0$, it follows that $K_P = K_C$. Consequently, the reaction is not dependent on the pressure.

If the following is established for the original gas composition:

$X_{CO} = 0$;
$X_{H2} = 0.03$;
$X_{CO2} = 0.012$;
$X_{H2O} = 0.00004$ and the molar fraction of the newly formed CO: $= Z$, the following results for the equilibrium composition of the molar fraction:

CO: = Z $CO_2 := X_{CO2} - Z$ $H_2 := X_{H2} - Z$ $H_2O := X_{H2O} + Z$

Then the mass action law is as follows:

$$K = Z(X_{H2O} + Z)/(X_{CO2} - Z)(X_{H2} - Z)$$

Solved according to Z, the following polynomial results:

$$(1 - K)Z^2 + (X_{H2O} + KX_{CO2} + KX_{H2})Z - KX_{CO2}X_{H2} = 0$$

if the value 0.6 is selected for K (680° C. [1256° F.]), the resulting analysis of the ideal state is as follows;

$H_2 = 2.24\%$,
$CO = 0.76\%$,
$CO_2 = 0.44\%$
$H_2O = 0.77\%$

With K = 0.01, for example, the following would apply:
$H_2 = 2.83\%$,
$CO = 0.17\%$,
$CO_2 = 1.03\%$
$H_2O = 0.17\%$ Theoretically, the composition of the gas mixture can vary within the following ranges:
$H_2 = 2.24\%$ to 2.83%
$CO = 0.17\%$ to 0.76%
$CO_2 = 0.44\%$ to 1.03%
$H_2O = 0.17\%$ to 0.77%

In this case, the following was measured during an experiment:
$H_2 = 2.1\%$,
$CO = 0.78\%$,
$CO_2 = 0.86\%$,
$H_2O = 0.06\%$ This gas composition corresponds to a certain Point 3 in the C-H-O three-substance system (FIG. 1).

The position of the point in the three-substance system determines the influence of the gas composition on the surface of the band steel.

Consequently, the addition of $CO_2$ to an $N_2$-$H_2$ gas mixture shifts the corresponding Point 1 of the gas composition in the three-substance system from a reduction range to a border range of oxidation. Depending on the method of operation of the furnace, the gas composition changes so that the water-gas equilibrium can vary between 0.01 and 0.6.

In this sense, an optimum concentration of the $CO_2$ utilization was found in order to fully utilize properties of the water-gas reaction for purposes of achieving annealing free of adhesives.

This is achieved using $CO_2$, for instance, 0.9% to 2.5% in the 97:3 $N_2$-$H_2$ gas mixture, that is, with relatively low $CO_2$ contents in comparison to exothermic gas.

Additional theoretical considerations have shown that an oxide coating or a $CO_2$ accumulated coating can be formed as a protective coating in the molecular range of the surface of the steel band, and this coating prevents adhesion of the spirals. In order to achieve this, a slightly oxidizing atmosphere has to be formed in the furnace during or at the end of the holding time during annealing, and this atmosphere creates a thin inactive coating (FeO) on the surface of the band steel.

FIG. 2 represents the $N_2$-$H_2$-$CO_2$ inert gas atmosphere in all annealing phases. Here, these were theoretically divided up into:

a) $H_2$-$H_2O$-gas mixture
b) $CO$-$CO_2$-gas mixture

Through the homogeneous water-gas reaction or through the two partial reactions, as described above, CO and $H_2O$ are formed in such quantities that the $CO$-$CO_2$ gas mixture is responsible for the oxidation above 600° C. [1112° F.].

The $H_2$-$H_2O$ gas mixture, on the other hand, has a reducing effect. As the temperature drops (cooling phase), the $CO$-$CO_2$ relationship of the inert gas which is present changes in such a way that a complete reducing force of the two gas mixtures is only utilized at a temperature below 600° C. [1112° F.].

The oxide coating formed is reduced at the end of the cooling phase.

The optimum use of $CO_2$ involved the entire surface of the annealed product and it amounts to 0.2 to 0.3 grams of $CO_2$ per m² of steel band surface.

The process according to the invention makes it possible to prevent or else to drastically reduce the formation of adhesives and to replace the generation of exothermic gas with synthetic gases. In comparison to exothermic gas with approximately 8% CO and 6% $CO_2$, it can be said to be an environmentally safe process since the emission of CO is reduced by approximately 95%, while the emission of $CO_2$ is reduced by about 92%.

SUMMARY

It is often the case the adhesives are formed on the surface when steel band having a low carbon content is annealed. In order to prevent this, the steel band is coated by means of oxidation with a thin coating at a temperature above 600° C. [1112° F.] (holding time), and this coating is then removed by reduction at a temperature below 600° C. [1112° F.] during the cooling phase. In the case of an inert gas consisting of nitrogen and hydrogen, carbon dioxide is preferred as the oxidation medium. The reduction takes place by changing the water-gas equilibrium.

I claim:

1. Process to prevent adhesion during the annealing of steel billets having a low content of carbon in an inert gas atmosphere consisting of 95% to 99% nitrogen and the rest of hydrogen; the process including sequentially heating up, maintaining and cooling off phases, the improvement being in that during the maintaining phase the steel billet is coated in a coating step with a thin covering layer by means of oxidation at temperatures above 600° C. [1112° F.], during the coating step 0.2 to 0.3 grams of $CO_2$ are added to the inert gas per square meter of the surface of annealing material, and completely removing the covering layer through reduction during the cooling off phase at temperatures below 600° C. [1112° F.].

2. Process according to claim 1, characterized in that the reduction takes place by a change in water equilibrium during the cooling off phase.

* * * * *